May 28, 1940.                    O. H. MOHR                    2,202,019
SOLAR ACTUATED COOLER
Filed March 28, 1939                    2 Sheets-Sheet 2
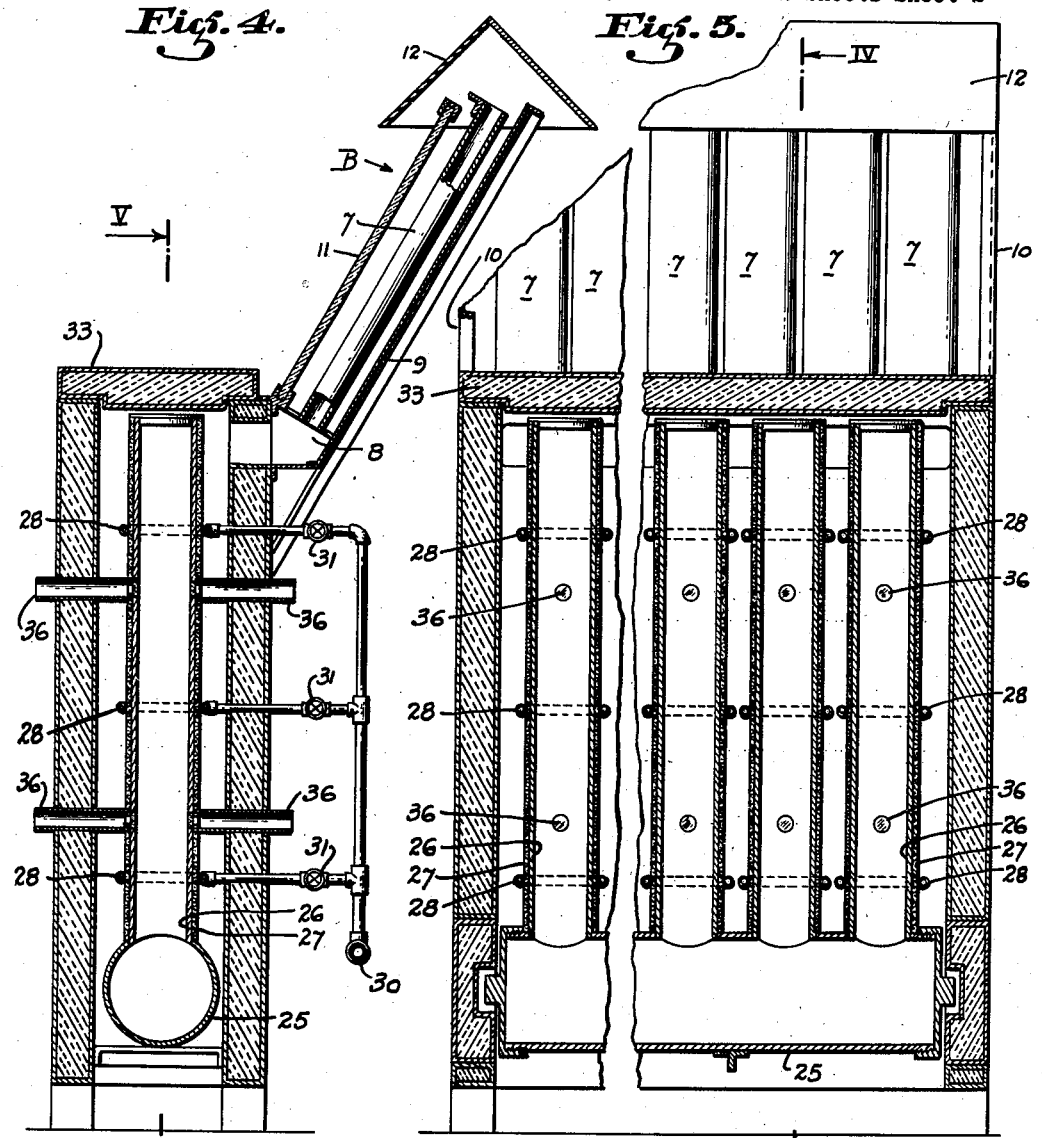
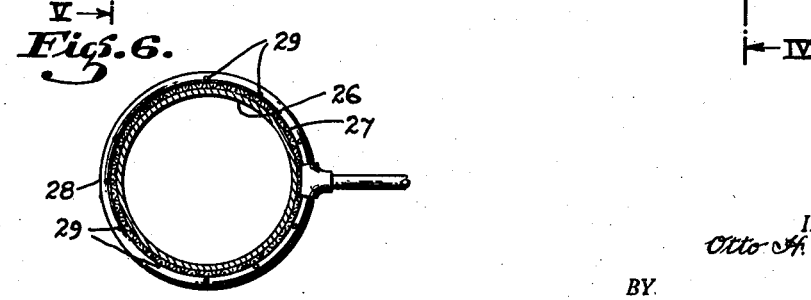
INVENTOR.
Otto H. Mohr.
BY
Chas. E. Townsend.
ATTORNEY.

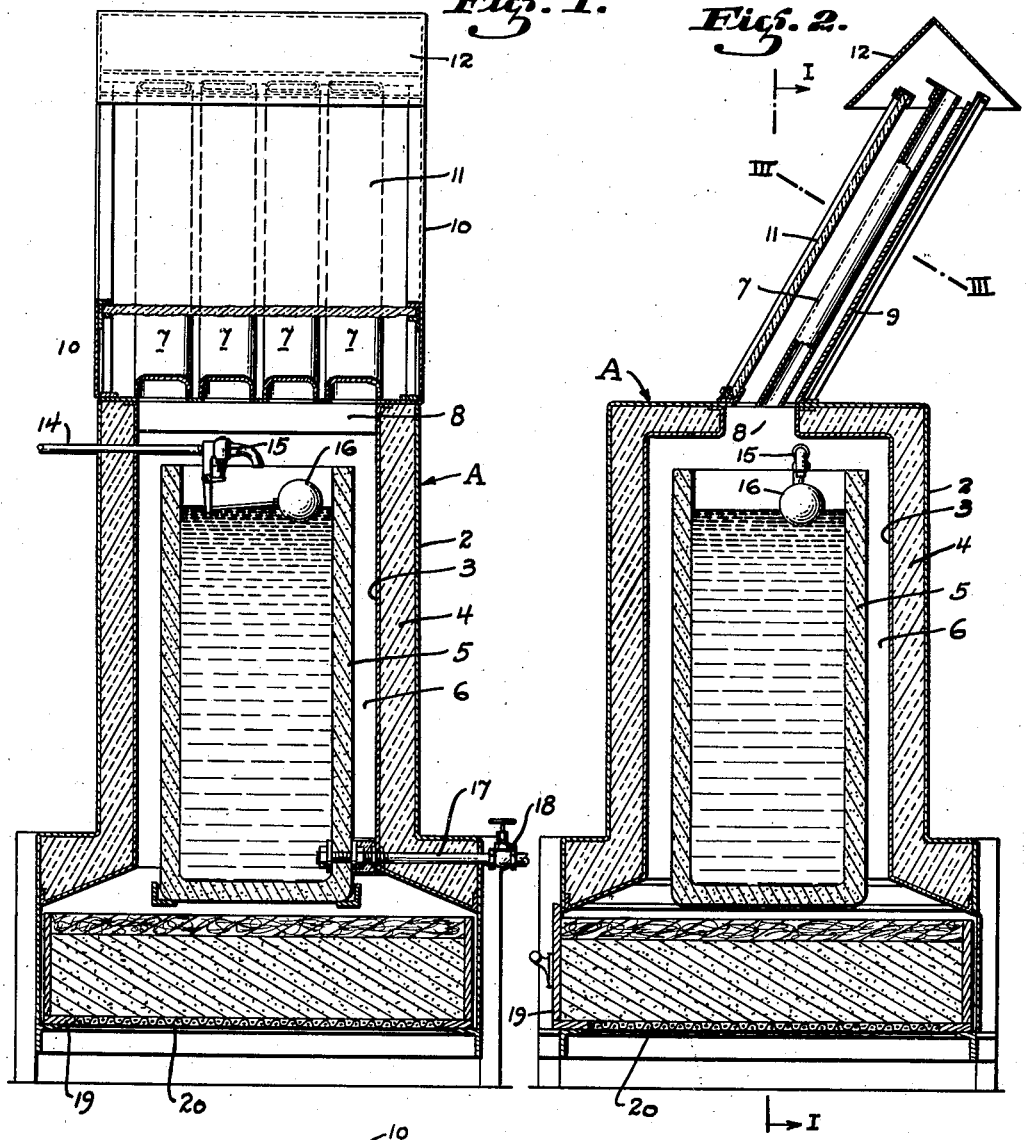

Patented May 28, 1940

2,202,019

UNITED STATES PATENT OFFICE 2,202,019

SOLAR ACTUATED COOLER

Otto H. Mohr, Concord, Calif., assignor to himself and Elizabeth F. Kells Mohr, Concord, Calif., joint tenancy with right of survivorship Application March 28, 1939, Serial No. 264,578

11 Claims. (Cl. 62—154)

This invention relates to an apparatus for cooling liquids, foods, or other substances, and especially to a cooler which is actuated by solar radiation or heat.

The object of the present invention is generally to improve and simplify the construction and operation of solar actuated coolers; to provide a cooler embodying a chamber or container for the reception of a liquid or other matter to be cooled, said chamber or container having an exterior surface or surfaces which are maintained sufficiently wet or moist to permit evaporation and cooling of the interior of the chamber; to provide solar actuated means for creating a draft or flow of air over the wet or moist surface to bring about rapid evaporation and cooling; and further, to provide means for reducing the moisture content of the air to a minimum prior to its passage over the wet or moistened surfaces, to further promote evaporation.

The cooler is shown by way of illustration in the accompanying drawings, in which Fig. 1 is a vertical cross section taken on line I—I of Fig. 2;

Fig. 2 is a vertical section taken at right angles to Fig. 1;

Fig. 3 is a cross section taken on line III—III of Fig. 1;

Fig. 4 is a central vertical cross section taken on line IV—IV of Fig. 5;

Fig. 5 is the central vertical longitudinal section taken on line V—V of Fig. 4, said view being partially broken away; and Fig. 6 is an enlarged cross section of one of the cooling tubes, said view also showing one of the water supply tubes surrounding the same.

Referring to the drawings in detail, and particularly to Figs. 1 and 2, A indicates in general a housing consisting of outer and inner walls, as indicated at 2 and 3 respectively, between which is placed an insulating material 4. The housing may be square or round in cross section, and of any height desired. Within the housing is disposed an earthenware container 5, the walls of which are sufficiently porous to permit water to percolate through and maintain the exterior surface sufficiently wet or moist to permit evaporation, with consequent cooling of the contents of the cooler. The container is smaller in diameter than the interior of the housing, so as to form a surrounding passage 6, and solar actuated means are provided for producing a continuous flow of air through said passage to promote and accelerate evaporation from the surface of the container.

The solar actuated means for producing a flow or draft of air through the passage 6 consists of one or more metal tubes or flues 7 which are exposed to the direct heat or rays of the sun. The outer ends of the tubes connect, through an opening 8 formed in the top of the housing, with the passage 6, while the upper ends open to the atmosphere; thus, as the tubes or flues become heated by exposure to the heat of the sun, the air within them becomes heated and as such continuously rises and discharges at the upper ends, thereby causing a continuous upward flow of air through the passage 6. The tubes or flues 7 may be supported in any suitable manner but are preferably disposed within a housing comprising a back wall 9 and sides 10—10, covered by a glass cover 11. This housing is open at both ends, and the lower end connects with the opening 8 in the top of the housing; as such, it also acts as a draft-producing passage, as the air within the housing becomes heated by the sun, and by conduction from the exterior surfaces of the flues 7. These flues 7, by the way, may be of any cross-sectional shape desired, but they are preferably flat as shown in Figs. 1 and 3, to present as large a surface as possible to the air flowing through and around them. The interior of the housing, and the flues themselves, are preferably painted black, to absorb as much heat as possible, and a hood 12 is placed over the upper end of the housing and the flues, to prevent a down-draft when wind is blowing and to exclude rain.

The cooler shown in the drawings is particularly designed for cooling water, and as such is connected with a suitable source of water supply, through means of a pipe 14. This pipe is provided with a valve 15, float controlled as indicated at 16, so that a constant water level will be automatically maintained. A pipe 17 is connected with the lower end of the container, and cold water may be withdrawn at will through a valve such as shown at 18.

The housing is enlarged at its lower end to form a compartment for a removable container in the form of a drawer 19. This drawer is provided with a screen bottom 20 which supports a layer of moisture-absorbing material such as calcium sulphate. A moisture-absorbing material of this character is preferable, as it is known as a regenerative type; that is, it may be removed from time to time and heated to drive out the moisture, and afterwards it may again be used. Over the top of the moisture-absorbing material is placed a layer of filtering material such as spun glass, to remove dust and other foreign matter carried by the air.

In certain climates, where the humidity of the air is very slight, the moisture-absorbing material may be entirely eliminated; on the other hand, in certain tropical regions the relative humidity of the air is very considerable, and in that instance the moisture-absorbing material may be employed to advantage, as the drier the air the greater is its moisture-absorbing capacity, and the greater the moisture-absorbing capacity of the air the greater the evaporation from the surface of the container. By employing a moisture-absorbing material such as calcium sulphate, it is only necessary to remove the drawer from time to time and to expose it to the direct sun rays, as this in many instances will be sufficient to dry or regenerate it. In other instances it may be necessary to place the drawer in an oven or adjacent some other source of heat, in order to drive off the moisture.

In actual operation coolers of this character have proven to be very efficient. Where the exterior temperature averages 100° F., or more, practical experience has shown that water may be cooled to an average temperature of 50° F. Apparently, the hotter the day and the drier the air, the greater the evaporating effect and hence the lower the final temperature of the medium to be cooled.

It will be noted by referring to Fig. 2 that the housing containing the heating flues 7 is disposed on an angle. This angle will vary with different latitudes. The angle should be such that it will be disposed as much as possible at right angles to the rays of the sun, so that as little reflection action as possible is encountered.

While the cooler here shown is particularly designed for cooling water, it may obviously be used for many other purposes; and while a porous earthenware container has been shown, any type of container may be employed, for instance an ordinary metallic container covered with burlap or a similar fabric, together with means for maintaining it wet or moist, is found to be practically as effective as an earthenware container. Where such a housing is employed, shelves may be placed therein, and it may then be used as a container for food commodities and other materials.

The apparatus may also be used for air conditioning and cooling. For instance, if it is desired to cool a house, ducts may pass through the cooling chamber and the air will thus be cooled before it enters the dwelling.

One use to which the solar cooler has been applied, besides the cooling of water, etc., is that of chilling or cooling oils, for instance fish oil, to a temperature where the stearine content solidifies and may be removed by settling, siltering or similar means. An apparatus suitable for this purpose is shown in Figs. 4 to 6 inclusive.

The apparatus comprises a lower horizontally disposed header tube 25, to which is secured by welding or otherwise a plurality of vertically disposed cooling tubes 26. These tubes, together with the header tube, are covered with canvas, burlap or like fabric material, generally indicated at 27, which is kept moist by continuous application of water thereto when the apparatus is in operation.

The water is applied in the following manner: Mounted exterior of each fabric-covered tube is one or more vertically spaced, snugly-fitting ring-shaped tubes 28, which are perforated on their inner faces as indicated at 29. Each tube 28 is connected with a water supply pipe 30, and the flow of water is regulated by valves 31. Due to the fact that each perforation is in contact with the fabric covering, a slight pressure will be desirable, and by proper regulation of the valves, just enough water to insure the proper degree of moisture will result without any waste by dripping or running off of water.

The housing enclosing the tubes will be constructed substantially in the same manner as that shown in Figs. 1 and 2, and so will the solar heater generally indicated at B. The drawer for the reception of calcium sulphate is not shown in the lower portion of the housing, but this may obviously be employed where climatic conditions would warrant its use.

In actual practice the upper part of the housing is provided with a hinged cover 33. This is opened, and the tubes are filled with the oil to be treated. Loose-fitting covers are placed on top of each tube 26 to exclude dust or other foreign matter, and the water is turned on to wet or moisten the fabric covering. The solar heater will, as previously described, cause a continuous upward flow of air around the tubes, and this will in turn cause evaporation of the water contained in the fabric covering. The oil contained in the tubes 25 and 26 is thus gradually cooled, and will finally assume the proper temperature to chill and precipitate the stearine content. Slow cooling is desirable, and is obtained by this method. Once the stearine is chilled or congealed, it slowly settles downwardly in the tubes and finally lodges in the horizontal bottom header 25. The settling of the congealed stearine takes place slowly, and should be under observation so that the upper or clarified oil may be drawn off from time to time.

In order that the degree of settling may be observed, sighting tubes such as indicated at 36 are provided. These tubes extend horizontally through the outer housing, the air passage and the tubes 26, and they are obviously closed with glass or suitable lenses to prevent air circulation and entrance of oil. By looking through these tubes, the oil will appear smoky or cloudy if settling has not been completed. On the other hand, by sighting through the top tube, the oil above may appear clear, and that portion of the oil may be siphoned or pumped out in any suitable manner. When the oil also shows clear in the lower sighting tube, the remaining oil may be siphoned or pumped out.

Fish oil contains a fairly large percentage of stearine, and this must accordingly be removed from the lower header as often as necessary. The header is provided with caps which may be unscrewed, and the ends of the housing are provided with doors which may be opened, so that the comparatively solid stearine may be shoved out with rods or the like.

Suffice it to say that this method provides an exceedingly cheap and economical way of removing stearine from fish oil and many other animal and vegetable oils, as the only actual cost involved, besides labor, is that of providing water to maintain the fabric-covered tubes sufficiently moist.

While certain features of the invention have been more or less specifically described and illustrated, I wish it understood that changes may be resorted to within the scope of the appended claims.

Having thus described and illustrated my invention, what I claim and desire to secure by Letters Patent is

1. A solar operated cooler comprising a housing having an air inlet and outlet, means for effecting evaporation of moisture in said housing, and a solar operated heater having an air passage formed therein whereby air is heated and a continuous convection flow maintained, said heater having an air inlet at its lower end connected with the outlet of the housing to accelerate evaporation and cooling of the interior of the housing.

2. A solar operated cooler comprising a housing having an air inlet and outlet, a cooling chamber within the housing, means for maintaining the exterior walls of the chamber moist, and a solar operated heater having an air passage formed therein connected with the outlet of the housing, whereby air is heated and a continuous convection flow maintained through the heater and housing for maintaining a flow of air over the moist surfaces of the cooling chamber to accelerate evaporation of moisture and cooling of the chamber.

3. A solar operated cooler comprising a housing having a cooling chamber formed therein and a draft passage around the chamber said passage having an air inlet and outlet, means for maintaining the exterior walls of the chamber moist, and a solar operated heater having an air passage formed therein connected with the outlet of the draft passage, whereby air is heated and a continuous convection flow maintained to bring about evaporation of the moisture and cooling of the chamber.

4. A solar operated cooler comprising a housing having a cooling chamber formed therein and a draft passage around the chamber, means for maintaining the exterior walls of the chamber moist, solar operated means for maintaining a continuous flow of air through the draft passage to bring about evaporation of the moisture and cooling of the chamber, and means for removing moisture from the air prior to entering said draft passage.

5. A solar operated cooler comprising a housing having a cooling chamber formed therein and a draft passage around the chamber said passage having an inlet and outlet, means for maintaining the exterior walls of the chamber moist, a metal flue extending above the housing and forming a continuation of said passage, and means enclosing and insulating said flue against the surrounding atmosphere, said means permitting the flue to be exposed to solar radiation to be heated thereby, and said flue heating air entering the same to cause continuous convection flow of air through the passage and flue to accelerate evaporation on the exterior walls of the chamber.

6. A water cooler comprising a container for the reception of water to be cooled, said container being porous to permit water to percolate through the walls to the exterior surface of the container to evaporate therefrom, a housing surrounding the container and spaced therefrom to form an air passage exterior of the porous container said passage having an air inlet at the bottom and an outlet at the top, and a solar operated heater having an air passage formed therein connected with the outlet of the housing, whereby air is heated and a continuous convection flow maintained for producing and maintaining a flow of air through said passage to accelerate evaporation on the exterior surface of the porous container.

7. A water cooler comprising a container for the reception of water to be cooled, said container being porous to permit water to percolate through the walls to the exterior surface of the container to evaporate therefrom, a housing surrounding the container and spaced therefrom to form an air passage exterior of the porous container, solar actuated means for producing and maintaining a flow of air through said passage to accelerate evaporation on the exterior surface of the porous container, and means for reducing the moisture content of the air to a minimum before entering said passage.

8. A water cooler comprising a container for the reception of water to be cooled, said container being porous to permit water to percolate through the walls to the exterior surface of the container to evaporate therefrom, a housing surrounding the container and spaced therefrom to form an air passage exterior of the porous container said passage having an air inlet and outlet, a metal flue extending above the housing and forming a continuation of said passage, and means for enclosing and insulating said flue against the surrounding atmosphere, said means permitting the flue to be exposed to solar radiation to be heated thereby and said flue heating air entering the same to cause continuous convection flow of air through the passage and flue to accelerate evaporation on the exterior surface of the porous container.

9. A liquid cooler comprising a bottom header pipe and a plurality of vertically disposed pipes connected therewith, said pipes adapted to contain a liquid to be cooled, a water absorbing material forming an exterior covering on each pipe, means for delivering water to maintain the covering moist, a housing enclosing the pipes and spaced therefrom to form an air passage around the pipes, and a metal flue forming a continuation of the air passage, said flue being exposed to solar radiation to be heated thereby, and said flue heating air entering the same to cause a continuous thermo-siphon flow of air through the passage and flue to accelerate evaporation of water from the exterior surfaces of the pipes.

10. A liquid cooler comprising a bottom header pipe and a plurality of vertically disposed pipes connected therewith, said pipes adapted to contain a liquid to be cooled, a water absorbing material forming an exterior covering on each pipe, means for delivering water to maintain the covering moist, a housing enclosing the pipes and spaced therefrom to form an air passage around the pipes, a metal flue forming a continuation of the air passage, said flue being exposed to solar radiation to be heated thereby, and said flue heating air entering the same to cause a continuous thermo-siphon flow of air through the passage and flue to accelerate evaporation of water from the exterior surfaces of the pipes, and a clean-out closure for each end of the bottom header pipe to permit removal of solids precipitated by cooling of the liquid.

11. A liquid cooler comprising a bottom header pipe and a plurality of vertically disposed pipes connected therewith, said pipes adapted to contain a liquid to be cooled, a water absorbing material forming an exterior covering on each pipe, means for delivering water to maintain the covering moist, a housing enclosing the pipes and spaced therefrom to form an air passage around the pipes, a metal flue forming a continuation of the air passage, said flue being exposed to solar radiation to be heated thereby, and said flue heating air entering the same to cause a continuous thermo-siphon flow of air through the passage and flue to accelerate evaporation of water from the exterior surfaces of the pipes, a clean-out closure for each end of the bottom header pipe to permit removal of solids precipitated by cooling of the liquid, and liquid-sighting tubes connected with the vertical pipes to permit visual observation of the liquid being cooled.

OTTO H. MOHR.